(12) United States Patent
Agardh et al.

(10) Patent No.: US 9,485,753 B2
(45) Date of Patent: Nov. 1, 2016

(54) METHODS AND DEVICES FOR ALLOCATING A RADIO RESOURCE FOR AN LTE-UNLICENSED DATA TRANSMISSION

(71) Applicant: Sony Corporation, Tokyo (JP)

(72) Inventors: Kåre Agardh, Rydeback (SE); Rickard Ljung, Helsingborg (SE); Yuichi Morioka, Reading (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/323,137

(22) Filed: Jul. 3, 2014

(65) Prior Publication Data
US 2016/0007322 A1 Jan. 7, 2016

(51) Int. Cl.
*H04W 72/04* (2009.01)
*H04W 16/14* (2009.01)

(52) U.S. Cl.
CPC ........... *H04W 72/04* (2013.01); *H04W 72/042* (2013.01); *H04W 16/14* (2013.01)

(58) Field of Classification Search
CPC ..... H04W 72/12; H04L 5/003; H04L 5/0001
See application file for complete search history.

(56) References Cited

U.S. PATENT DOCUMENTS

| | | | | |
|---|---|---|---|---|
| 2014/0287769 A1* | 9/2014 | Taori | ................. | H04W 74/0808 455/450 |
| 2015/0223075 A1* | 8/2015 | Bashar | ................. | H04W 16/14 370/329 |
| 2015/0264699 A1* | 9/2015 | Fwu | ..................... | H04W 72/12 370/329 |

OTHER PUBLICATIONS

3GPP workshop on LTE in unlicensed spectrum, Sophia Antipolis, France, Jun. 13, 2014; RWS-140002; Sari Nielsen and Antti Toskala, Nokia Corporation, NSN, "LTE in Unlicensed Spectrum: European regulation and Co-existence Considerations", 13 pages.
3GPP workshop on LTE in unlicensed spectrum, Sophia Antipolis, France, Jun. 13, 2014; RWS-140003; Marc Grant, AT&T, Adhoc on LTE in Unlicensed Spectrum, "Assisted Access for LTE", 11 pages.
3GPP workshop on LTE in unlicensed spectrum, Sophia Antipolis, France, Jun. 13, 2014; RAN64, Sophia Antipolis, France, Jun. 13, 2014; CableLabs, Rogers, Benu Networks, Ruckus Wireless; RWS-140004, "CableLabs Perspectives on LTE-U Coexistence with Wi-Fi and Operational Modes for LTE-U", 15 pages.
3GPP workshop on LTE in unlicensed spectrum, Sophia Antipolis, France, Jun. 15, 2014; HiSilicon, RWS-140005, "Scenarios, spectrum considerations and preliminary assessment results of U-LTE", 21 pages.
3GPP workshop on LTE in unlicensed spectrum, Sophia Antipolis, France, Jun. 13, 2014; InterDigital, RWS-140006, "A Look at the Requirements for LTE in the Unlicensed Bands", 17 pages.
3GPP workshop on LTE in unlicensed spectrum, Sophia Antipolis, France, Jun. 13, 2014; T-Mobile USA, RWS-140007, "View on LTE Carrier Aggregation with Unlicensed Spectrum", 8 pages.

(Continued)

*Primary Examiner* — Jae Y Lee
(74) *Attorney, Agent, or Firm* — Myers Bigel & Sibley, PA

(57) ABSTRACT

A method for allocating a radio resource for a Long Term Evolution-unlicensed, LTE-U, data transmission of a communication device in an unlicensed frequency band is disclosed. The method includes the communication device determining a time gap duration until a start time of a subframe. The communication device selects a resource allocation transmission from a plurality of resource allocation transmissions as a function of the determined time gap duration. Related communication devices, methods by devices, and systems are disclosed.

19 Claims, 7 Drawing Sheets

(56) References Cited

OTHER PUBLICATIONS

3GPP workshop on LTE in unlicensed spectrum, Sophia Antipolis, France, Jun. 13, 2014; Qualcomm, Lorenzo Casaccia, "Extending the benefits of LTE to unlicensed spectrum", 20 pages.

3GPP workshop on LTE in unlicensed spectrum, Sophia Antipolis, France, Jun. 10-13, 2014; 3GPP TSG-RAN #64, RWS-140009, China Unicom, "Consideration of Unlicensed LTE Spectrum in China", 8 pages.

3GPP workshop on LTE in unlicensed spectrum, Sophia Antipolis, France, Jun. 13, 2014; Sony Mobile Communications, RWS-140010, "Requirements and Coexistence Topics for LTE-U", 11 pages.

3GPP workshop on LTE in unlicensed spectrum, Sophia Antipolis, France, Jun. 13, 2014; TeliaSonera, RWS-140011, "An operator view on LTE in unlicensed spectrum", 7 pages.

* cited by examiner

METHODS AND DEVICES FOR ALLOCATING A RADIO RESOURCE FOR AN LTE-UNLICENSED DATA TRANSMISSION

FIELD OF THE INVENTION

Embodiments of the invention relate to wireless communication. Embodiments of the invention relate in particular to communication in long term evolution (LTE)-unlicensed (LTE-U) frequency bands.

BACKGROUND OF THE INVENTION

With increasing popularity of mobile voice and data communication, there is an ever increasing demand for high-speed voice and data communication. The licensed spectrum for cellular communication is rapidly being exhausted by a dense and growing subscriber base. This applies in particular to the valuable low-frequency bands with low propagation loss traits.

A significant amount of unlicensed spectrum is available. For illustration, a significant amount of spectrum is globally available in the 5 GHz band. It is desirable to utilize the LTE-unlicensed (LTE-U) spectrum to augment the capacity of licensed frequency carriers. The LTE-U spectrum may be used for carrying data traffic for mobile services. The purpose of LTE-U is to extend LTE cellular communication to unlicensed spectrum.

Carrier aggregation may be performed in which usage of LTE-U spectrum and LTE licensed spectrum are combined. The LTE licensed carrier may be a primary carrier. The LTE-U carriers may be secondary carriers to which data traffic may be offloaded in the downlink or both in the uplink and in the downlink. LTE-U data transmissions may still be controlled by the primary carrier. The secondary cell (Scell) may be logically synchronized to the primary cell (Pcell). LTE-U data transmissions which may include control data and payload data may be started at subframe boundaries which are defined by signalling over primary carriers in the LTE licensed spectrum. The start times of the subframes may be determined by Pcell signalling.

The radio resource in the LTE-U frequency bands which is intended to be used for an LTE-U data transmission must be free at the start time of the subframe at which the LTE-U data transmission is performed. Because the spectrum in the unlicensed frequency bands may also be used by communication techniques different from cellular communication, a communication device, e.g. an eNodeB, will not always be able to transmit when it intends to transmit LTE-U data. The reason for this is that radio resources in the LTE-U spectrum may be co-utilized by Wi-Fi or other non-cellular communication techniques.

It would be desirable to reduce the risk that further communication device start utilizing a radio resource in the LTE-U frequency band in a time gap remaining until the next subframe starts.

BRIEF SUMMARY OF THE INVENTION

There is a continued need in the art for devices, systems and methods which mitigate at least some of the above shortcomings. There is a need for devices, systems and methods in which a risk that another device starts using a radio resource in the LTE-U spectrum at which a communication device intends to transmit LTE-U data may be mitigated. There is a need for such devices, systems and methods in which the probability that a radio resource in the LTE-U frequency band remains free until the start time of the next subframe may be enhanced.

According to embodiments, a communication device which is configured for a long term evolution (LTE) unlicensed (LTE-U) data transmission in a LTE-U spectrum may transmit a resource allocation transmission. The resource allocation transmission may be selected from a plurality of possible resource allocation transmissions as a function of a time gap duration which remains until a next subframe on a primary cell starts.

The communication device may select the resource allocation transmission to be either a signal which includes timing information or a signal which does not include timing information, depending on the time gap duration. The signal which includes the timing information may be transmitted when the time gap duration until the start time of the next subframe is longer, to thereby indicate the time duration for which the respective radio resource in the LTE-U frequency band should remain unused by other communication devices. The signal which does not include the timing information, e.g. a dummy signal, may be transmitted when the time gap duration until the start time of the next subframe is so short that it does not allow the signal with the timing information to be transmitted before the next subframe starts.

The communication device may select the resource allocation transmission to be either a signal which triggers a further communication device, e.g. a user equipment, to respond or a signal which does not cause any further communication device to respond. The signal which causes the further communication device to respond may be transmitted when the time gap duration is longer, to thereby mitigate hidden node problems. The signal which does not cause any further communication device to transmit a response, e.g. a dummy signal, may be transmitted when the time gap duration until the start time of the next subframe is so short that it does not allow the response to be received before the next subframe starts.

The methods, devices and systems according to embodiments allow a communication device to perform a resource allocation for allocating a radio resource in an LTE-U frequency band. This mitigates the risk that a further communication device, e.g. a Wi-Fi device or a WLAN access point, starts transmitting at the next subframe boundary at which the communication device intends to transmit LTE-U data in the radio resource of the LTE-U frequency band.

A method of allocating a radio resource for an LTE-unlicensed, LTE-U, data transmission of a communication device in an unlicensed frequency band according to an embodiment comprises determining, by the communication device, a time gap duration until a start time of a subframe. The communication device may select a resource allocation transmission from a plurality of resource allocation transmissions. The communication device may select the resource allocation transmission as a function of the determined time gap duration.

The plurality of supported resource allocation transmissions may comprise a first resource allocation transmission, and a second resource allocation transmission different from the first resource allocation transmission.

The first resource allocation transmission may cause a further communication device to transmit a response to the communication device. The second resource allocation transmission may not cause the further communication device to transmit the response. Thereby, hidden node problems may be mitigated selectively depending on the time gap duration.

Either the first resource allocation transmission or the second resource allocation transmission may be selected in dependence on a threshold comparison of the time gap duration.

The first resource allocation transmission may be selected if the time gap duration exceeds a threshold. The second resource allocation transmission may be selected if the time gap duration is less than the threshold.

The communication device may generate the selected resource allocation transmission such that it includes a time information which depends on the time gap duration. At least one of the first resource allocation transmission and the second resource allocation transmission may include the time information. In some embodiments, only one of the first resource allocation transmission and the second resource allocation transmission includes the time information. In other embodiments, both the first resource allocation transmission and the second resource allocation transmission include the time information.

The time information may depend on both the time gap duration and a subframe duration. The subframe duration may be defined by signalling on an LTE licensed carrier.

The time information may be a sum of the time gap duration and the sub-frame duration.

The first resource allocation transmission may be a signal indicating that the communication device intends to perform the LTE-U data transmission in the subframe.

The first resource allocation transmission may be a Wi-Fi Request to Send (RTS) signal. The Wi-Fi RTS signal may comprise a Frame Control field, a Duration field, a Receiver Address (RA) field, and a Frame Check Sequence (FCS) field. Time information which defines the time for which the radio resource in the LTE-U frequency band shall be kept free by other devices may be included in the Duration field. The time information may be set to be equal to the sum of the time gap duration and the subframe duration.

The communication device may receive a response to the selected resource allocation transmission from a further communication device before the start time of the subframe. The response may include the timing information which is included in the selected resource allocation transmission. Hidden node problems may thereby be mitigated.

The response may be a Wi-Fi Clear to Send (CTS) signal. The Wi-Fi CTS signal may comprise a Frame Control field, a Duration field, a Receiver Address (RA) field, a transmitter address (TA) field, and a Frame Check Sequence (FCS) field. Time information which defines the time for which the radio resource in the LTE-U frequency band shall be kept free by other devices may be included in the Duration field. The time information may be set to be equal to the Duration field of the Wi-Fi RTS transmitted by the communication device.

The second resource allocation transmission may consist of dummy data. The dummy data may be data which does not carry information and which keeps the radio resource busy until the LTE-U data transmission can be started at the next subframe boundary.

The communication device may transmit the selected resource allocation transmission in the radio resource which is intended to be used for the LTE-U data transmission and before the start time of the subframe.

The communication device may start the LTE-U data transmission in the radio resource allocated for the LTE-U data transmission at the start time of the sub-frame. A secondary cell which utilizes LTE-U frequency bands may thereby be synchronized with a primary cell which utilizes LTE licensed frequency bands. The communication device may transmit an LTE-U preamble before the start time of the sub-frame.

The LTE-U data transmission may be controlled by signalling on a LTE licensed carrier.

The LTE-U data transmission may comprise LTE-U control data transmitted in the unlicensed band.

The LTE-U data transmission may comprise LTE-U payload data transmitted in the unlicensed band. The LTE-U payload data may be mobile service data.

The communication device may be an evolved NodeB (eNodeB).

The communication device may be a user equipment of a cellular communication network.

A communication device according to an embodiment may comprise a transmitter configured to transmit LTE-unlicensed, LTE-U, radio signals in an unlicensed frequency band. The communication device may be configured to determine a time gap duration until a start time of a subframe. The communication device may be configured to select a resource allocation transmission from a plurality of resource al-location transmissions as a function of the determined duration of the time gap duration, the resource allocation transmission allocating a radio resource for an LTE-U data transmission of the communication device.

The communication device may comprise a processing device which is configured to control the communication device to perform the method according to any embodiment.

The communication device may be configured to select the resource allocation transmission from a group which comprises a first resource allocation transmission, and a second resource allocation transmission different from the first resource allocation transmission.

The first resource allocation transmission may cause a further communication device to transmit a response to the communication device. The second resource allocation transmission may not cause the further communication device to transmit the response. Thereby, hidden node problems may be mitigated selectively depending on the time gap duration.

Either the first resource allocation transmission or the second resource allocation transmission may be selected in dependence on a threshold comparison of the time gap duration.

The first resource allocation transmission may be selected if the time gap duration exceeds a threshold. The second resource allocation transmission may be selected if the time gap duration is less than the threshold.

The communication device may be configured to generate the selected resource allocation transmission such that it includes a time information which depends on the time gap duration. The communication device may be configured to generate the selected resource allocation transmission such that at least one of the first resource allocation transmission and the second resource allocation transmission may include the time information. In some embodiments, only one of the first resource allocation transmission and the second resource allocation transmission includes the time information. In other embodiments, both the first resource allocation transmission and the second resource allocation transmission include the time information.

The communication device may be configured to generate the selected resource allocation transmission such that the time information depends on both the time gap duration and a subframe duration. The subframe duration may be defined by signalling on an LTE licensed carrier.

The communication device may be configured to generate the selected resource allocation transmission such that the time information is a sum of the time gap duration and the sub-frame duration.

The communication device may be configured to generate the selected resource allocation transmission such that the first resource allocation transmission is a signal indicating that the communication device intends to perform the LTE-U data transmission in the subframe.

The communication device may be configured to generate the selected resource allocation transmission such that the first resource allocation transmission is a Wi-Fi Request to Send (RTS) signal.

The communication device may be configured to receive a response to the selected resource allocation transmission from a further communication device before the start time of the subframe.

The response may include the timing information which is included in the selected resource allocation transmission. Hidden node problems may thereby be mitigated.

The response may be a Wi-Fi Clear to Send (CTS) signal.

The communication device may be configured to generate the selected resource allocation transmission such that the second resource allocation transmission consists of dummy data. The dummy data may be data which does not carry information and which keeps the radio resource busy until the LTE-U data transmission can be started at the next subframe boundary.

The communication device may be configured to transmit the selected resource allocation transmission in the radio resource which is intended to be used for the LTE-U data transmission and before the start time of the subframe.

The communication device may be configured to start the LTE-U data transmission in the radio resource allocated for the LTE-U data transmission at the start time of the sub-frame. A secondary cell which utilizes LTE-U frequency bands may thereby be synchronized with a primary cell which utilizes LTE licensed frequency bands. The communication device may be configured to transmit an LTE-U preamble before the start time of the sub-frame.

The communication device may be configured to start the LTE-U data transmission such that LTE-U data transmission is controlled by signalling on a LTE licensed carrier.

The communication device may be configured to generate the LTE-U data transmission such that it comprises LTE-U control data transmitted in the unlicensed band.

The communication device may be configured to generate the LTE-U data transmission such that it comprises LTE-U payload data transmitted in the unlicensed band. The LTE-U payload data may be mobile service data.

The communication device may be an evolved NodeB (eNodeB).

The communication device may be a user equipment of a cellular communication network.

A communication system according to an embodiment comprises a communication device according to an embodiment. The communication system may comprise a further communication device configured to receive the resource allocation transmission. The resource allocation transmission may prevent the further communication device from transmitting in the allocated radio resource at the start time of the subframe.

The communication device may be an eNodeB. The further communication device may be one of a Wi-Fi transmitting device, a user equipment of a cellular network, or a WLAN access point.

In the methods, devices, and systems according to embodiments, the unlicensed frequency band may be a portion of a radio spectrum which is not licensed to any operator of a cellular communication network.

In the methods, devices, and systems according to embodiments, the unlicensed frequency band may be the 5 GHz band or may comprise at least one subband of the 5 GHz band.

Devices, systems and methods according to embodiments allow a communication device to mitigate the risk that other devices block LTE-U radio resources at the subframe boundary at which the communication device intends to start the LTE-U data transmission in the unlicensed frequency band.

BRIEF DESCRIPTION OF THE DRAWINGS

Embodiments of the invention will be described with reference to the accompanying drawings in which the same or similar reference numerals designate the same or similar elements.

DETAILED DESCRIPTION

Exemplary embodiments of the invention will be described with reference to the drawings. While some embodiments will be described in the context of specific fields of application, e.g. in the context of certain spectral ranges and communication techniques, the embodiments are not limited to this field of application. The features of the various embodiments may be combined with each other unless specifically stated otherwise.

Figure 1:
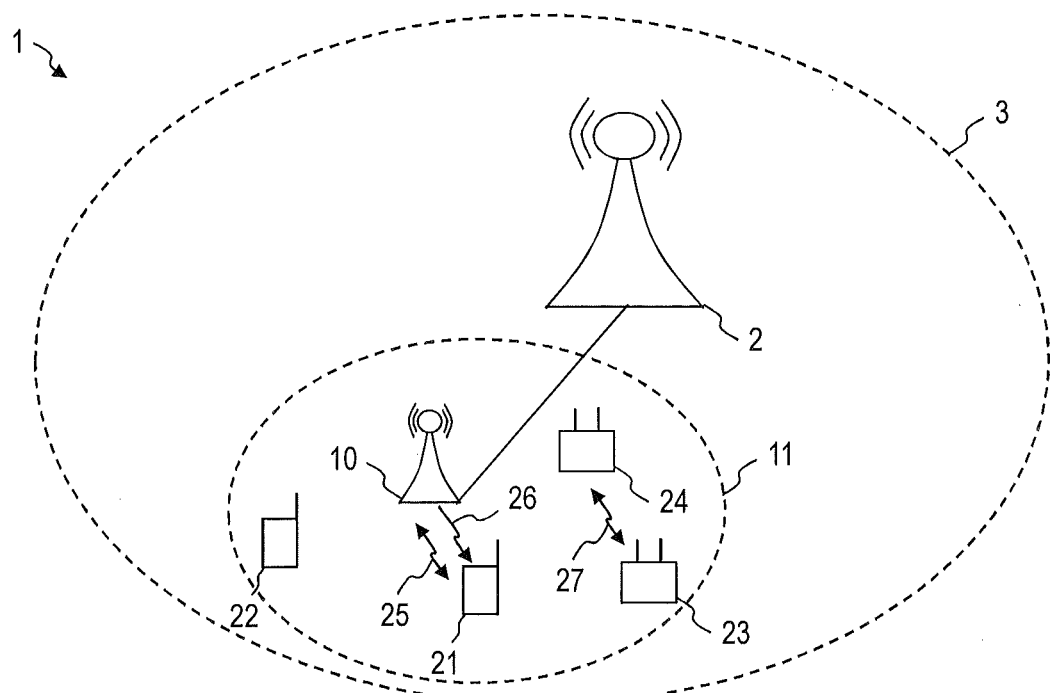
FIG. 1 is a schematic view of a communication system according to an embodiment.

FIG. 1 is a schematic view of a communication system 1 according to an embodiment. The communication system 1 illustrates one of various possible exemplary scenarios in which transmissions in Long Term Evolution (LTE)-unlicensed (LTE-U) frequency bands may be employed. A cellular communication network has a radio access network having a base station 2. The base station 2 may serve a macro cell 3. There may be one or several smaller operator deployed cell(s) 11. The cell 11 may be a micro cell or a pico cell. An eNodeB 10 may be deployed by an operator of the cellular communication network for serving the cell 11. The cell 11 of the cellular communication network may support a transmission of the LTE traffic data both in LTE licensed frequency bands and in LTE-U frequency bands.

The unlicensed frequency bands which may be used for LTE-U data transmissions may be frequency bands which are not licensed to any cellular network operator. The LTE-U frequency bands may include at least some subbands of the 5 GHz band, for example. The LTE-U frequency bands may include a frequency band from 5150 MHz to 5350 MHz, which is a subband of the 5 GHz band. Alternatively or additionally, the LTE-U frequency bands may include a frequency band from 5150 MHz to 5250 MHz, which is another subband of the 5 GHz band. Alternatively or additionally, the LTE-U frequency bands may include a frequency band from 5250 MHz to 5350 MHz, which is another subband of the 5 GHz band. Alternatively or additionally, the LTE-U frequency bands may include a frequency band from 5470 MHz to 5725 MHz, which is another subband of the 5 GHz band.

Any one of various deployment options may be used for aggregating unlicensed spectrum to a licensed carrier to augment capacity. In a Supplemental Downlink (SDL) mode of operation, the unlicensed spectrum may be utilized only for the downlink to augment capacity and increase data rates in a heavily trafficked downlink. In a Carrier Aggregation (CA) mode of operation allows use of unlicensed spectrum in both the downlink and uplink. The CA mode allows the amount of unlicensed spectrum resource that can be allocated for uplink or downlink to be adjusted.

FIG. 1 exemplarily illustrates a SDL mode of operation. Downlink (DL) and uplink (UL) control signalling and data traffic may be transmitted in the LTE-licensed carrier frequencies by radio signals 25. At least DL traffic may be transmitted from the eNodeB to a further communication device 21, which may be a user equipment of the cellular network, in a LTE-U radio signal 26. The LTE-U radio signal may have a frequency in the LTE-U frequency band.

Offloading data traffic to the LTE-U frequency bands may be performed selectively for only some of the user equipments in the cell 11. For illustration, the eNodeB 10 may perform LTE-U data transmissions for DL traffic to the user equipment 21, but may not perform LTE-U offloading for another user equipment 22.

While FIG. 1 exemplarily shows a scenario in which the eNodeB acts as a communication device which performs LTE-U data transmissions using radio resources in an LTE-U frequency band, the techniques according to embodiments can also be used when the user equipment 21 acts as a communication device which perform LTE-U data transmissions using radio resources in an LTE-U frequency band. The LTE-U data transmissions may be DL or UL transmissions.

The LTE-U frequency bands may also be co-utilized by one or several devices 23, 24 which are not under a control of a cellular network operator. Examples for such devices 23, 24 include Wi-Fi devices or WLAN access points. The presence of such device 23, 24 which are configured to transmit in a LTE-U frequency band which is intended to be used for LTE-U data transmissions may lead to interference problems. For illustration, the eNodeB will not be able to transmit a LTE-U data transmission in a radio resource which is used by one or several of the devices 23, 24 at a start time of a subframe at which the LTE-U data transmission is intended to be started. Transmissions 27 between the devices 23, 24 may have a frequency in the LTE-U frequency bands and are prone to causing interference with a LTE-U data transmission.

As will be explained in more detail below, a communication device according to an embodiment may mitigate the risk that a LTE-U data transmission cannot be performed because of conflicting transmissions by further communication devices, such as the non-cellular communication devices 23, 24, at the start time of a subframe. The communication device may determine a time gap duration of a time gap which remains until the start time of a next subframe and may select a resource allocation transmission in dependence on the time gap duration. The resource allocation transmission may be selected from a finite set of possible resource allocation transmissions. The finite set of possible resource allocation transmissions may include at least one resource allocation transmission which includes a time information and at least one further resource allocation transmission which does not include a time information. The at least one further resource allocation transmission may be dummy data, for example. The resource allocation transmission may be selected from a finite set of possible resource allocation transmissions. The finite set of possible resource allocation transmissions may include at least one resource allocation transmission which causes a further communication device to transmit a response and at least one further resource allocation transmission which does not cause any further communication device to transmit a response. The at least one resource allocation transmission may be a Wi-Fi Request to Send (RTS) signal. The at least one further resource allocation transmission may be a Wi-Fi Clear to Send (CTS) signal or dummy data, for example.

The communication device which generates and transmits the resource allocation transmission may perform at least one threshold comparison of the time gap duration. Depending on a result of the threshold comparison one of the plurality of resource allocation transmissions may be selected. If the time gap duration is sufficiently long, e.g. longer than a first threshold, the communication device may transmit as the resource allocation transmission a request signal which causes a further communication device to transmit a response. Both the request signal and the response may include timing information defining for how long the radio resource in the LTE-U frequency band should be kept clear so that the LTE-U data transmission may be performed by the communication device. If the time gap duration is short, e.g. shorter than a second threshold, the communication device may transmit as the resource allocation transmission a series of dummy bits. the series of dummy bits may be generated such that it does not include any information or may include information, e.g. LTE-U pilot data. A number of bits of the dummy data may be set in dependence on the time gap duration.

Figure 2:
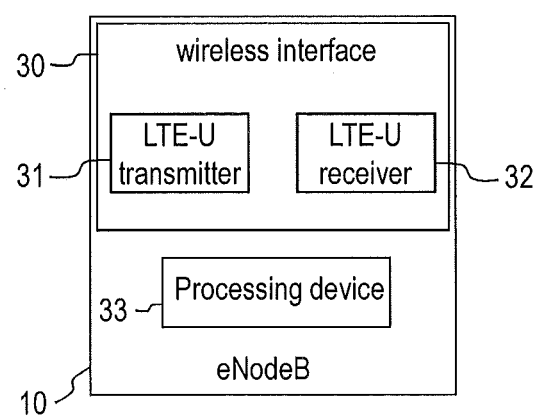
FIG. 2 is a schematic view of a communication device according to an embodiment.

FIG. 2 is a diagram of a communication device 10 according to an embodiment. The communication device 10 is configured as an eNodeB. However, a configuration as explained with reference to FIG. 2 may be implemented in any LTE-U transmitting device. For illustration, a user equipment of the cellular communication network may be operative as explained in more detail with reference to FIG. 2 to FIG. 12 below and the LTE-U data transmission may be an UL transmission.

The communication device 10 comprises a wireless interface 30. The wireless interface 30 may be configured to transmit and receive data over an eUTRA air interface. The wireless interface 30 comprises a LTE-U transmitter 31. The LTE-U transmitter 31 is configured to transmit LTE data. The LTE-U transmitter 31 may be configured to transmit traffic data in accordance with a Physical Downlink Shared Channel (PDSCH). The LTE-U transmitter 31 may be configured to use radio resources from a LTE-U frequency band which are not licensed to any cellular network operator for transmitting the traffic data. The LTE-U transmitter 31 may optionally be configured to transmit control data in accordance with a Physical Downlink Control Channel (PDCCH). The LTE-U transmitter 31 may be configured to use radio resources from a LTE-U frequency band which are not licensed to any cellular network operator for transmitting the control data. The LTE-U transmitter 31 may be configured to perform a modulation to generate LTE-U radio signals having a frequency in a frequency band which is not licensed to any cellular network operator.

The wireless interface 30 may optionally comprise a LTE-U receiver 32. The LTE-U receiver 32 may be configured to perform LTE-U demodulation. The LTE-U receiver 32 may be configured to demodulate radio signals having a frequency in a frequency band which is not licensed to any cellular network operator.

The communication device 10 may have a processing device 33. The processing device 33 may be configured to monitor, via the LTE-U receiver 32, whether other communication devices use radio resources in the LTE-U spectrum. The processing device 33 may be configured to determine a time gap duration remaining until the start time of the next subframe. The processing device 33 may be configured to select the resource allocation transmission which is to be performed from among at least two possible resource allocation transmissions. The processing device 33 may use the time gap duration as input for determining which one of the at least two possible resource allocation transmissions is to be performed. At least one of the possible resource allocation transmissions may include a time information which indicates for how long the communication device 10 intends to use the radio resource for the LTE-U data transmission. At least another one of the possible resource allocation transmissions may not include a time information which indicates for how long the communication device 10 intends to use the radio resource for the LTE-U data transmission. The processing device 33 may be configured to perform a threshold comparison of the time gap duration to determine which resource allocation transmission is to be performed. The processing device 33 may be configured to compare the time gap duration to two thresholds or to more than two thresholds to determine which resource allocation transmission is to be performed.

The processing device 33 may be configured to control the LTE-U transmitter 31 such that the resource allocation transmission is transmitted in the radio resource in which the LTE-U data transmission is intended to be performed. The processing device 33 may be configured to control the LTE-U transmitter 31 such that the resource allocation transmission terminates before the start time of the next subframe and that the LTE-U data transmission can be synchronized to the start time of the next subframe. The start times of subframes may respectively be defined by signalling on carriers different from the LTE-U spectrum. The start time of subframes may respectively be defined by signalling on LTE licensed frequencies of a primary cell.

The processing device 33 may be configured to control the LTE-U transmitter 31 to perform the LTE-U data transmission in the allocated resource. The LTE-U data transmission may be performed at the same frequency at which the resource allocation transmission was transmitted.

The processing device 33 may be configured to dynamically adjust a number of bits of the resource allocation transmission in dependence on the time gap duration to the start time of the next subframe of the cellular network, at least for one of the resource allocation transmissions of the plurality of resource allocation transmissions. The number of bits of the resource allocation transmission may be set depending on the time which remains until the next subframe starts. The number of bits of the resource allocation transmission may be set such that the plurality of bits is transmitted until the start of the next subframe, and that the LTE-U data transmission may start at the beginning of the next subframe. This allows the LTE-U data transmissions to be synchronized to the subframes of the cellular communication network even when no time information is included in the resource allocation transmission.

Various effects are attained by selecting a resource allocation transmission which depends on how much time remains until the start time of the next subframe. Other devices, e.g. the non-cellular devices 23, 24, are less likely to start using a radio resource when the communication device 10 transmits the resource allocation transmission to block radio resource until the LTE-U data transmission is started.

The techniques according to embodiments may be used when unlicensed and licensed carriers are integrated. Carrier aggregation mechanisms of LTE Rel-10 to Rel-12 may serve the purpose of aggregating LTE-U carriers and licensed LTE carriers. The LTE-U carrier may be integrated as secondary carrier into a LTE licensed network, as illustrated in FIG. 3 and FIG. 4.

Figure 3:
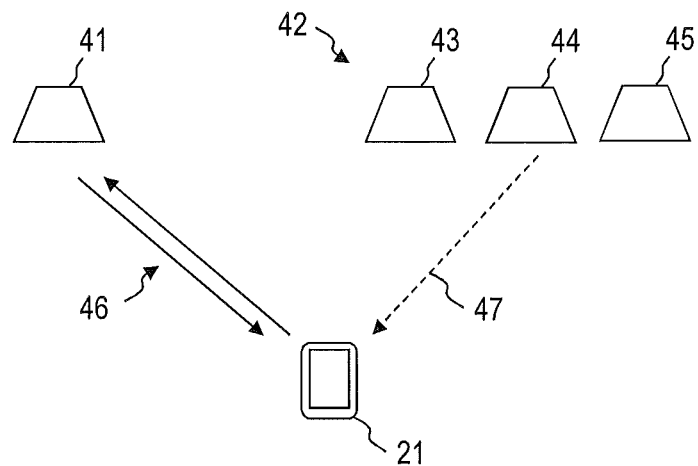
FIG. 3 shows a utilization of an LTE-U frequency band in a method and system according to an embodiment.

FIG. 3 illustrates a scenario in which a communication device may use a carrier 41 licensed to the cellular network operator and radio resources in a LTE-U frequency band 42. The LTE-U frequency band 42 may include several carriers 43-45.

The licensed carrier 41 may be used for DL and UL control signalling and data transmissions 46. The radio resource for the LTE-U data transmission, e.g. a carrier in the LTE-U frequency band 42, may be used at least for DL LTE data traffic. DL data traffic may be offloaded to the secondary carrier when needed.

Figure 4:
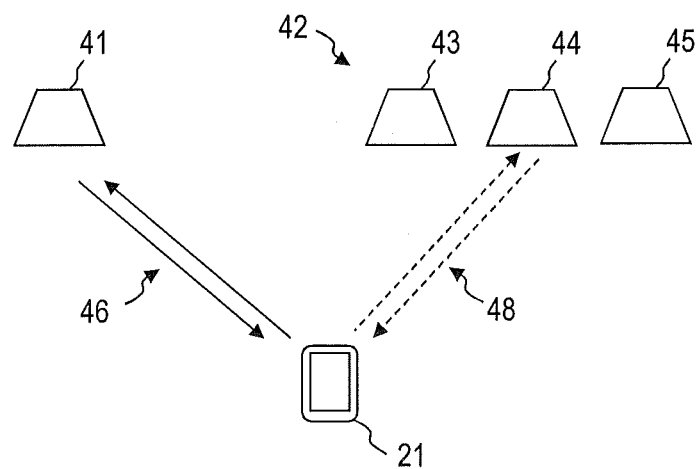
FIG. 4 shows a utilization of an LTE-U frequency band in a method and system according to an embodiment.

FIG. 4 illustrates a scenario in which the radio resource for the LTE-U data transmission, e.g. a carrier in the LTE-U frequency band 42, may be used at least for UL and DL LTE data traffic. UL and DL data traffic may be offloaded to the secondary carrier when needed. The LTE-U spectrum may be operated in time division duplex (TDD).

In any one of the various implementations, the communication device according to an embodiment may mitigate the risk of interference for LTE-U data transmissions by selecting and transmitting a resource allocation transmission, as will be explained in more detail with reference to FIG. 5 to FIG. 12.

Figure 5:
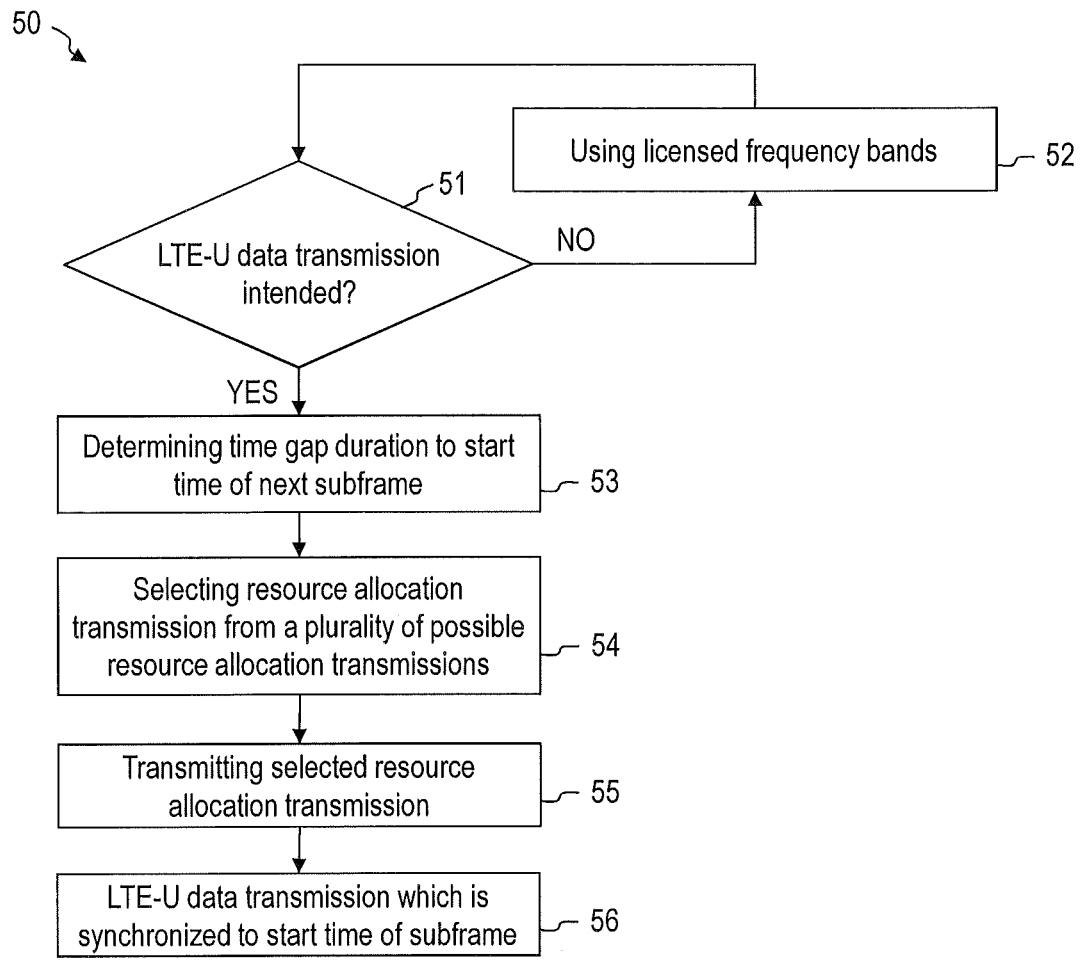
FIG. 5 is a flow chart of a method according to an embodiment.

FIG. 5 is a flow chart of a method 50 according to an embodiment. The method 50 may be performed by the communication device according to an embodiment. The method 50 may be performed by an eNodeB according to an embodiment.

At 51, the communication device determines whether a LTE-U data transmission is intended to be performed. A decision on whether LTE-U data transmissions are to be performed may depend on a traffic load in the downlink, for example. Offloading to LTE-U may be selectively activated only when the traffic load in the downlink exceeds a threshold.

At 52, if it is not intended to perform LTE-U data transmissions, the carriers licensed to a cellular network operator may be used. The method may return to 51.

At 53, if it is intended to perform a LTE-U data transmission, the usage of one or several carriers of the LTE-U frequency band(s) may be monitored. An LTE-U receiver may detect radio energy on respectively each one of several carriers to determine which one(s) of the several carriers are being used by other devices. When an unused radio resource is the LTE-U frequency band has been detected, a duration of a time gap which remains before the next subframe of the cellular network starts is determined. The communication device may process signalling received on a primary carrier not included in the LTE-U frequency band to determine the start time of the next subframe.

At 54, a resource allocation transmission may be selected. The resource allocation transmission may be selected in dependence on the time gap duration determined at 53. The resource allocation transmission may be selected from a plurality of different resource allocation transmissions, in dependence on the determined time gap duration. The resource allocation transmission may be selected to be a request signal which includes a time information and which triggers a receiving communication device to transmit a response back to the communication device, if the time gap duration allows the response to be received before the start time of the next subframe. The resource allocation transmission may be selected to be a signal which includes a time information and which does not trigger a receiving communication device to transmit a response back to the communication device, if the time gap duration does not allow the response to be received before the start time of the next subframe. The resource allocation transmission may be a signal which does not include any time information if the time gap duration does not allow a signal comprising time information to be transmitted before the start time of the next subframe. The signal which does not include any time information may consist of random or other dummy data, for example.

At 55, the selected resource allocation transmission is transmitted. The resource allocation transmission may be transmitted in a radio resource, in particular at a frequency, which is in the LTE-U frequency band. The resource allocation transmission may be transmitted in the radio resource, in particular at a carrier frequency, at which the LTE-U data transmission is intended to be performed.

At 56, the communication device performs the LTE-U data transmission. The LTE-U data transmission may be synchronized to a boundary of a subframe of the cellular communication network. The LTE-U data transmission may be started at the start time of the next subframe, i.e. of the subframe which is subsequent to the detection that the radio resource has become free. A LTE-U preamble may be transmitted just before the start time of the subframe. The LTE-U data transmission and the resource allocation transmission may use the same carrier frequency in the LTE-U frequency band.

Figure 6:
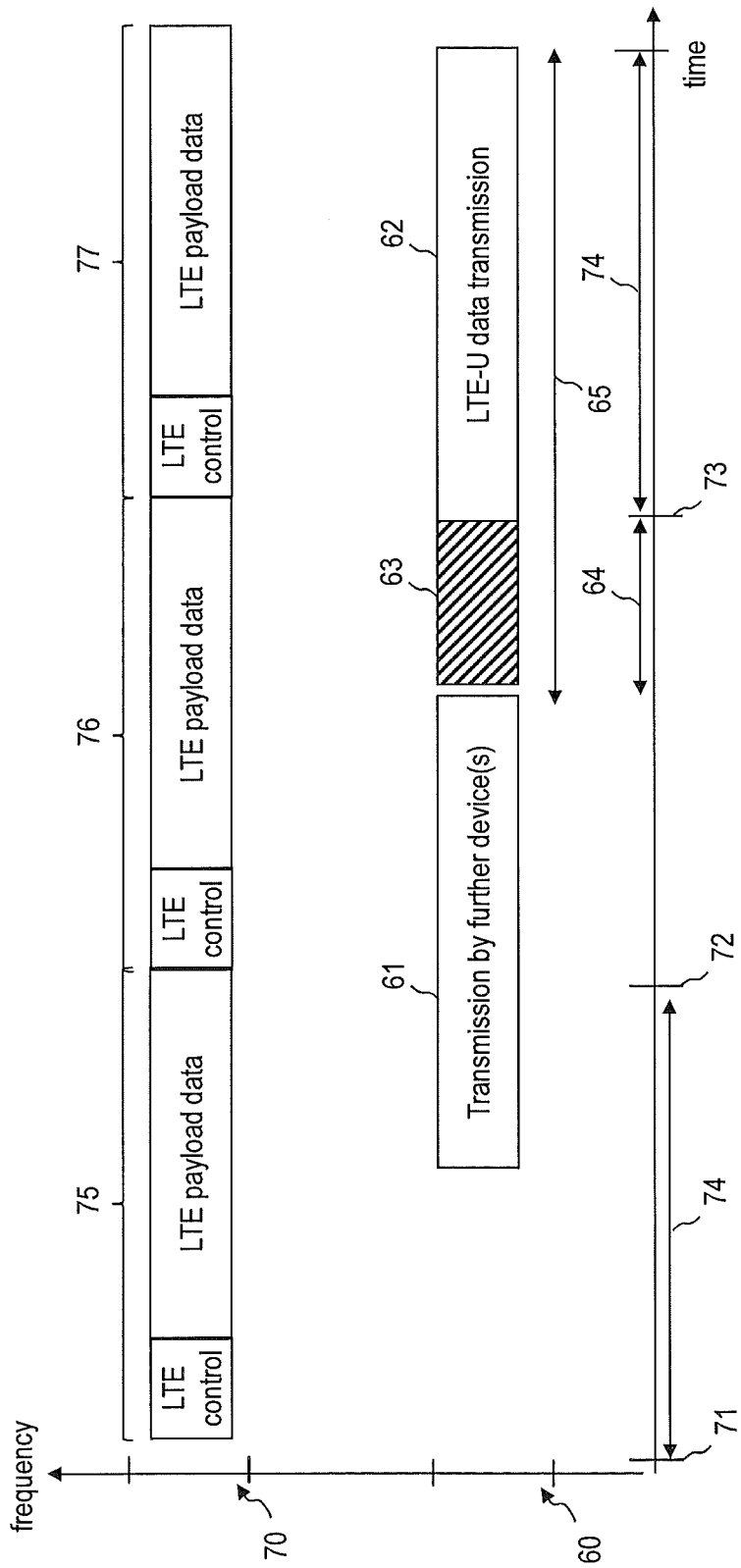
FIG. 6 is a view illustrating a resource allocation of a radio resource in an LTE-U frequency band by a communication device according to an embodiment.

FIG. 6 is a view illustrating operation of a communication device according to an embodiment when a radio resource 60, e.g. a LTE-U carrier in an LTE-U frequency band, is to be used for the LTE-U data transmission 62. The radio resource 60 is located in the LTE-U frequency band which is different from the licensed carriers 70 which are licensed to a network operator. In a cellular communication network, control signalling may use a licensed carrier 70. Control data and payload data may respectively be transmitted in each one of several subframe 75-77. Boundaries 71-73 of the subframes 75-77 are determined by signalling on the licensed carrier 70. The licensed carrier 70 may be an LTE licensed carrier. The subframes may have a duration 74 determined by signalling on the licensed carrier 70.

The communication device may detect that the radio resource 60 is used by one or several further device(s). For illustration, a Wi-Fi device or other non-cellular device may use the radio resource 60 for transmitting a Wi-Fi frame 61. The communication device may monitor the energy at the frequency of the radio resource 60 to determine whether the radio resource 60 is used by one or several further device(s).

When the communication device detects that the usage of the radio resource 60 by the other device terminates, it may output energy in the radio resource 60 to prevent the further communication device(s) from starting a new transmission just before the LTE-U data transmission 62 starts. The communication device may transmit a resource allocation transmission 63 in a time gap remaining until a start time 73 of the next subframe. A time gap duration 64 of the time gap remaining until the start time 73 of the next subframe may be used as input for determining which resource allocation transmission is to be transmitted. The resource allocation transmission may, but does not need to extend to the start time 73 of the next subframe. For illustration, and as will be explained in more detail with reference to FIG. 7 to FIG. 12, the communication device may transmit a request signal to a further communication device within the time gap and may optionally receive a response from the further communication device within the time gap. Both the request signal and the response may be shorter than the time gap duration 64.

Various types of resource allocation transmissions may be supported. Various criteria may be used for selecting a resource allocation transmission from a plurality of possible resource allocation transmissions, as will be explained in more detail with reference to FIG. 7 to FIG. 12.

Figure 7:
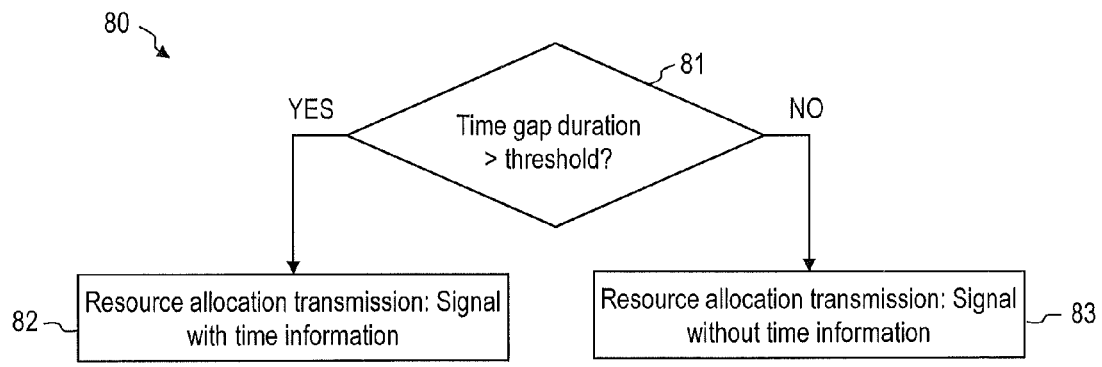
FIG. 7 is a flow chart of a selection of a resource allocation transmission by a communication device according to an embodiment.

FIG. 7 is a flow chart of a selection procedure 80 which may be used by a communication device according to an embodiment to select a resource allocation transmission. The selection procedure 80 may be used to perform step 54 of the method 50.

At 81, the communication device may determine whether the time gap duration exceeds a threshold. The threshold may be defined such that a time gap duration exceeding the threshold allows a resource allocation transmission which includes timing information to be transmitted.

At 82, if the time gap duration exceeds the threshold, a signal including time information may be selected as the resource allocation transmission. The signal including the time information may be a request which indicates that the communication device intends to use the respective radio resource for the LTE-U data transmission. The time information may indicate a time duration until an end of the LTE-U data transmission. The time information may be set to depend on both the time gap duration and the duration of a subframe. The time information may be set to be the sum of the time gap duration and the duration of the subframe in which the LTE-U data transmission is performed.

At 83, if the time gap duration does not exceed the threshold, a signal which does not include time information may be selected as the resource allocation transmission. The signal which does not include time information may be a series of dummy bits transmitted by the communication device to put energy in the radio resource, which prevents further communication devices from starting a usage of the respective radio resource.

Figure 8:
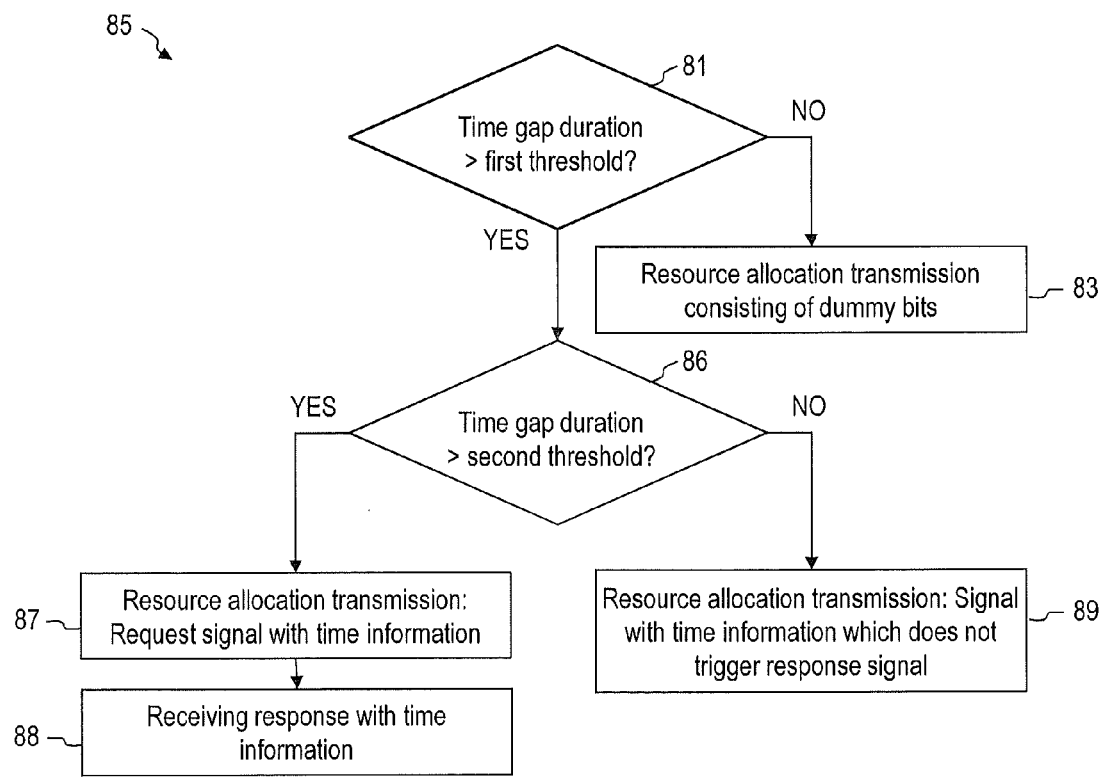
FIG. 8 is a flow chart of a selection of a resource allocation transmission by a communication device according to an embodiment.

FIG. 8 is a flow chart of a selection procedure 85 which may be used by a communication device according to an embodiment to select a resource allocation transmission. The selection procedure 85 may be used to perform step 54 of the method 50.

At 81, the communication device may determine whether the time gap duration exceeds a threshold. The threshold may be defined such that a time gap duration exceeding the threshold allows a resource allocation transmission which includes timing information to be transmitted.

At 83, if the time gap duration does not exceed the threshold, a signal which does not include time information may be selected as the resource allocation transmission. The signal which does not include time information may be a series of dummy bits transmitted by the communication device to put energy in the radio resource, which prevents further communication devices from starting a usage of the respective radio resource.

At 86, if the time gap duration exceeds the threshold, it may be determined whether the time gap duration exceeds a further threshold which is greater than the threshold used at 81. The further threshold may be set such that a time gap duration exceeding the further threshold allows the communication device to both transmit a request signal indicating that the communication device intends to use the radio resource and receive a response signal from a further communication device. The transmission of the response signal may further reduce the risk that the radio resource is occupied at the next subframe boundary, because hidden node problems may be mitigated.

At 87, if the time gap duration exceeds the further threshold, a request signal indicating that the communication device intends to use the radio resource and including time information may be transmitted. The time information may indicate for how long the communication device intends to use the radio resource in the LTE-U frequency band. The time information may correspond to a sum of the time gap duration and the subframe duration of the subframe in which the LTE-U data transmission is performed. The request signal may be transmitted to a further communication device. The further communication device may be a user equipment of a cellular communication network or a device which is not configured to attach to the cellular communication network. The further communication device may be a Wi-Fi-transceiver or a WLAN access point, for example.

At 88, the communication device receives a response from the further communication device. The further communication device may be triggered to transmit the response by receipt of the request signal at 87. The further communication device may be configured to generate the response such that it also includes the time information which was previously transmitted by the communication device in the request signal at 87.

At 89, if the time gap duration does not exceed the further threshold, a signal including time information may be transmitted. The signal at 89 may be different from the request signal at 87. the signal at 89 may be configured such that it does not trigger a receiving device to transmit a response back to the communication device. The time information may indicate for how long the communication device intends to use the radio resource in the LTE-U frequency band. The time information may correspond to a sum of the time gap duration and the subframe duration of the subframe in which the LTE-U data transmission is performed.

Figure 9:
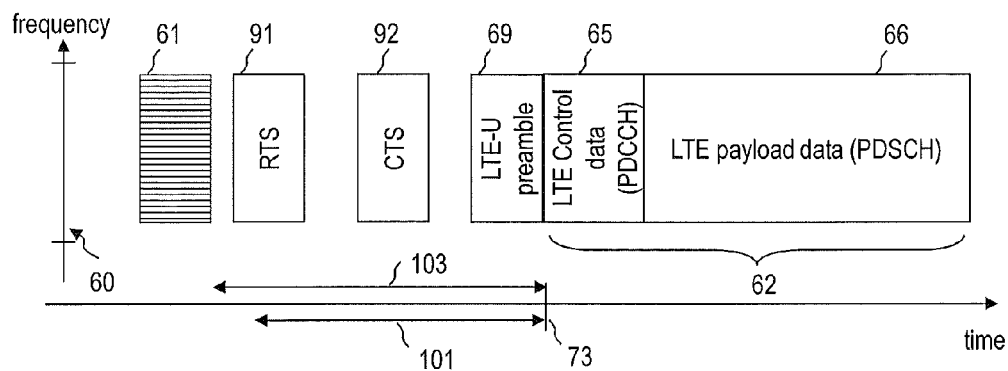
FIG. 9 is a view illustrating a resource allocation of a radio resource in an LTE-U frequency band by a communication device according to an embodiment.
Figure 10:
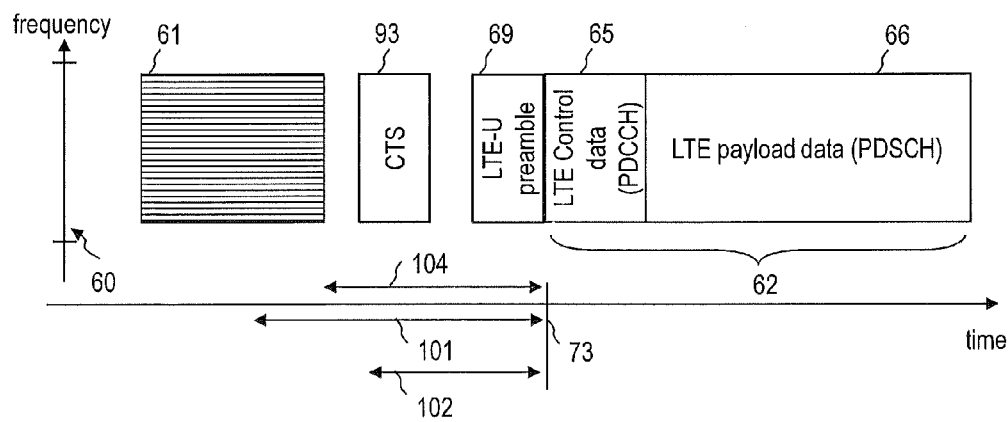
FIG. 10 is a view illustrating a resource allocation of a radio resource in an LTE-U frequency band by a communication device according to an embodiment.
Figure 11:
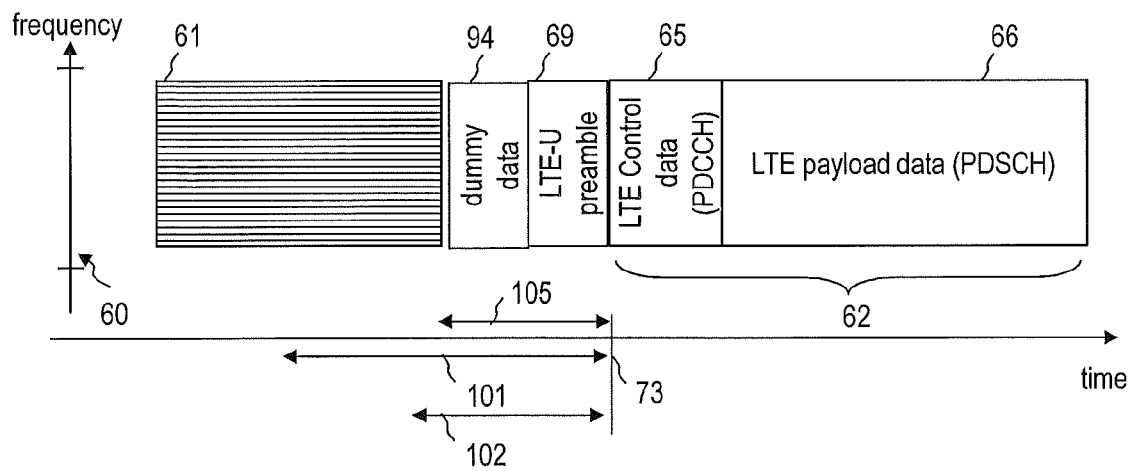
FIG. 11 is a view illustrating a resource allocation of a radio resource in an LTE-U frequency band by a communication device according to an embodiment.

FIG. 9 to FIG. 11 are views illustrating operation of a communication device according to an embodiment when a radio resource 60, e.g. a LTE-U carrier in a LTE-U frequency band, is to be used for the LTE-U data transmission 62. Different resource allocation transmissions may be transmitted depending on a time gap duration to the boundary of the next subframe. The time gap duration may be compared to a first threshold 101 and optionally to a second threshold 102 to determine which resource allocation transmission is to be selected.

The LTE-U data transmission 62 is synchronized to a start 73 of a subframe which is the next subframe after usage 61 of the radio resource 60 by other devices terminates. The usage 61 may be non-cellular usage. The usage 61 may be a Wi-Fi transmission, for example. An LTE-U preamble 69 may optionally be transmitted before the start time 73 of the subframe. The LTE-U data transmission 62 may comprise control data 65 and payload data 66.

FIG. 9 shows operation of the communication device when the radio resource 60 becomes free at a time such that a time gap duration 103 until the start time 73 of the next subframe exceeds the first threshold 101.

To mitigate the risk that the communication device is prevented from starting the LTE-U data transmission 62, a resource allocation transmission 91 is transmitted by the communication device. The resource allocation transmission 91 is selected to be a signal which indicates that the communication device intends to use the radio resource 60 in the next subframe. The resource allocation transmission 91 may include a time information. The time information may indicate the duration until the end of the LTE-U data transmission 62.

The resource allocation transmission 91 may trigger a further communication device to transmit a response 92. The response 92 may include the same time information which was included in the resource allocation transmission 91. Devices which are hidden from the communication device may thereby also be informed of the time duration for which the communication device intends to use the radio resource 60.

The resource allocation transmission 91 may be a Request to Send (RTS) signal. The RTS signal may comprise a Frame Control field, a Duration field, a Receiver Address (RA) field, and a Frame Check Sequence (FCS) field. The time information which defines the time until the end of the LTE-U data transmission may be included in the Duration field. The time information may be set to be equal to the sum of the time gap duration and the subframe duration.

The response 92 may be a Clear to Send (CTS) signal. The CTS signal may comprise a Frame Control field, a Duration field, a Receiver Address (RA) field, a transmitter address (TA) field, and a Frame Check Sequence (FCS) field. Time in-formation which defines the time until the end of the LTE-U data transmission may be included in the Duration field. The time information may be set to be equal to the Duration field of the resource allocation transmission 91 transmitted by the communication device.

The RTS signal transmitted as the resource allocation transmission 91 may be a Wi-Fi RTS signal. The response 92 may be a Wi-Fi CTS signal.

The first threshold 101 to which the time gap duration 103 is compared may be set such that it allows both the resource allocation transmission 91 and the response 92 to transmitted in the radio resource 60. The communication device receives the response 92 before the LTE-U preamble 69 is transmitted.

FIG. 10 shows operation of the communication device when the radio resource 60 becomes free at a time such that a time gap duration 104 until the start time 73 of the next subframe is less than the first threshold 101. The time gap duration 104 may exceed a second threshold 102 which is less than the first threshold 101.

To mitigate the risk that the communication device is prevented from starting the LTE-U data transmission 62, a resource allocation transmission 93 is transmitted by the communication device. The resource allocation transmission 93 is selected to be a signal which indicates that the communication device intends to use the radio re-sources 60 in the next subframe. The resource allocation transmission 93 may include a time information. The time information may indicate the duration until the end of the LTE-U data transmission 62.

The resource allocation transmission 93 may be a signal which does not trigger the response 92 to be transmitted. For illustration, the resource allocation transmission 93 may be a signal sent by the communication device to itself, so that further communication devices will still be able to retrieve the time information but do not transmit a response signal to the resource allocation transmission 93. The further communication devices may use the time information indicated in the resource allocation transmission 93 to determine for which time they shall not use the radio resource 60.

The resource allocation transmission 93 may be a Clear to Send (CTS) signal. The CTS signal may comprise a Frame Control field, a Duration field, a Receiver Address (RA) field, a transmitter address (TA) field, and a Frame Check Sequence (FCS) field. The RA field and the TA field may have identical addresses in the resource allocation transmission 93. Time in-formation which defines the time until the end of the LTE-U data transmission may be included in the Duration field. The time information may be set to be equal to the Duration field of the resource allocation transmission 91 transmitted by the communication device. The resource allocation transmission 93 thus may serve as a dummy message which informs other devices of the time for which the communication device intends to use the radio resource 60.

The resource allocation transmission 93 may be a Wi-Fi CTS signal.

The second threshold 102 to which the time gap duration 104 is compared may be set such that it allows the resource allocation transmission 93 including time information to be transmitted.

FIG. 11 shows operation of the communication device when the radio resource 60 becomes free at a time such that a time gap duration 105 until the start time 73 of the next subframe is less than the first threshold 101 and is less than the second threshold 102.

To mitigate the risk that the communication device is prevented from starting the LTE-U data transmission 62, a resource allocation transmission 94 is transmitted by the communication device. The resource allocation transmission 94 may be generated such that it does not include any time information which indicates until when the communication device intends to use the radio resource. The resource allocation transmission 94 may be generated such that it includes dummy bits. The dummy bits may be random bits or may be a pre-defined sequence of bits. The resource allocation transmission 94 puts energy into the radio resource 60 which is detected by further communication devices and which makes it less likely that the further communication devices start transmitting in the radio resource 60 until the LTE-U data transmission is started. The resource allocation transmission 94 may include information, e.g. LTE-U pilot data.

Figure 12:
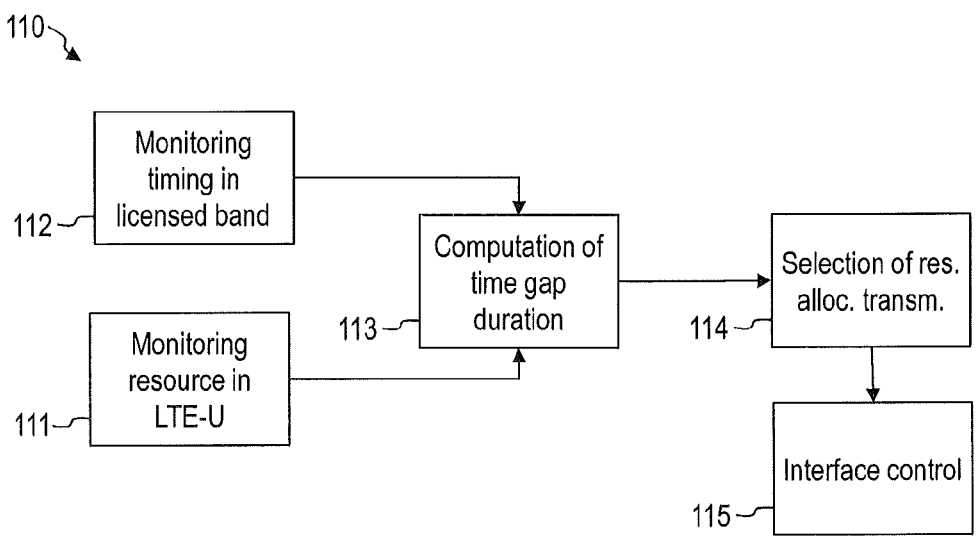
FIG. 12 is block diagram of a communication device according to an embodiment.

FIG. 12 is a functional block diagram 110 of a communication device according to an embodiment. The communication device may be an eNodeB. The various processing functions explained with reference to FIG. 12 may be implemented in a base station logic.

The communication device may comprise a resource usage monitoring module 111 which monitors a resource usage of LTE-U radio resources. The resource usage monitoring module 111 may determine a radio signal energy in each one of a plurality of LTE-U carriers.

The communication device may comprise a timing monitoring module 112 which monitors a timing of a cellular network. The timing monitoring module 112 may be configured to retrieve information on boundaries of subframes from control signalling in frequency bands which are licensed to a cellular network operator and which are different from the LTE-U frequency band.

The communication device may comprise a computing module 113 for computing a time gap duration. The computing module 113 may determine a time gap remaining until a start of a next subframe when a radio resource of the LTE-U frequency band becomes free for usage of the communication device. Computation of the time gap may be triggered when the communication device intends to perform a LTE-U data transmission and detects that a radio resource in the LTE-U frequency band becomes free.

The communication device may comprise a selection module 114 for selecting a resource allocation transmission from a plurality of resource allocation transmissions. The selection may use the time gap duration as input. The selection module 114 may be configured to perform at least one threshold comparison to determine which one of several resource allocation transmissions is to be used.

The communication device may comprise an interface control module 115. The interface control module 115 may be configured to control a transmitter such that the resource allocation transmission is output before the LTE-U data transmission. The interface control module 115 may be configured to control the transmitter such that the resource allocation transmission and the LTE-U data transmission are transmitted as a radio signal on a carrier which is a LTE-U carrier.

The communication device may comprise additional functional entities. For illustration, in order to accommodate an integration of LTE-U carriers as secondary carriers with LTE licensed carriers, the communication device may comprise a carrier aggregation module. The carrier aggregation module may perform control signalling for data traffic offloaded to the secondary LTE-U carriers.

Various effects are attained by the devices, methods and systems according to embodiments. For illustration, the communication device may mitigate the risk that a further communication device starts using a LTE-U radio resource just before the communication device starts a LTE-U data transmission.

It will be appreciated that, in any one of the devices, methods and systems of embodiments described above, the communication device may select different resource allocation transmissions for securing a radio resource for different LTE-U data transmissions. The respectively selected resource allocation transmission may depend on timing, in particular on the time gap duration until the next subframe boundary. The respectively selected resource allocation transmission may vary as the time gap duration varies, which may be the case from one LTE-U data transmission to the next LTE-U data transmission.

While exemplary embodiments have been described with reference to the drawings, modifications may be implemented in other embodiments. For illustration, the communication device does not need to be an eNodeB. The communication device may be a user equipment which performs LTE-U data transmissions in the uplink. The user equipment may mitigate the risk that a further communication device starts using a LTE-U radio resource just before the communication device starts a LTE-U data transmission using the techniques described herein.

For further illustration, while specific resource allocation transmissions and specific techniques of selecting one of a plurality of resource allocation transmissions have been described, other resource allocation transmissions and other criteria may be employed in other embodiments.

Although the invention has been shown and described with respect to certain preferred embodiments, equivalents and modifications will occur to others skilled in the art upon the reading and understanding of the specification. The present invention includes all such equivalents and modifications, and is limited only by the scope of the following claims.

What is claimed is:

1. A method of allocating a radio resource for an LTE-unlicensed data transmission of a communication device in an unlicensed frequency band, the method comprising:
   in response to detecting that the LTE-unlicensed data transmission is to be performed,
      determining, by the communication device, a time gap duration until a start time of a subframe; and
      selecting, by the communication device, a resource allocation transmission from a plurality of resource allocation transmissions as a function of the determined time gap duration,
   wherein the selecting the resource allocation transmission comprises selecting a Wi-Fi Request to Send signal if the time gap duration exceeds a threshold, and selecting one of a Wi-Fi Clear to Send signal or dummy data if the time gap duration is less than the threshold.

2. The method of claim 1,
   wherein the plurality of resource allocation transmissions comprises:
      a first resource allocation transmission, and
      a second resource allocation transmission different from the first resource allocation transmission.

3. The method of claim 2,
   wherein the first resource allocation transmission causes a further communication device to transmit a response to the communication device and wherein the second resource allocation transmission does not cause the further communication device to transmit the response.

4. The method of claim 2,
   wherein selecting the resource allocation transmission comprises:
      selecting either the first resource allocation transmission or the second resource allocation transmission in dependence on a threshold comparison of the time gap duration.

5. The method of claim 2,
   wherein selecting the resource allocation transmission comprises:
      selecting the first resource allocation transmission if the time gap duration exceeds a threshold.

6. The method of claim 2,
   wherein the first resource allocation transmission is a signal indicating that the communication device intends to perform the LTE-unlicensed data transmission in the subframe.

7. The method of claim 6,
   wherein the first resource allocation transmission is a Wi-Fi Request to Send signal.

8. The method of claim 2, further comprising:
   receiving, by the communication device, a response to the selected resource allocation transmission from a further communication device, the response being received before the start time of the subframe.

9. The method of claim 2,
   wherein the second resource allocation transmission consists of dummy data.

10. The method of claim 2,
    wherein the second resource allocation transmission is a Wi-Fi Clear to Send signal which is transmitted by the communication device and which is addressed to the communication device.

11. The method of claim 1,
    wherein the communication device generates the selected resource allocation transmission comprising a time information which depends on the time gap duration.

12. The method of claim 11,
    wherein the time information depends on both the time gap duration and a subframe duration.

13. The method of claim 12,
    wherein the time information is a sum of the time gap duration and the subframe duration.

14. The method of claim 1, further comprising:
    transmitting, by the communication device, the selected resource allocation transmission in the radio resource allocated for the LTE-unlicensed data transmission and before the start time of the subframe.

15. The method of claim 14, further comprising:
    starting, by the communication device, the LTE-unlicensed data transmission in the radio resource allocated for the LTE-unlicensed data transmission at the start time of the subframe.

16. The method of claim 1,
    wherein the LTE-unlicensed data transmission is controlled by signalling on a LTE licensed carrier.

17. A communication device, comprising:
    a transmitter configured to transmit LTE-unlicensed, radio signals in an unlicensed frequency band,
    the communication device being configured to, in response to determining that an LTE LTE-unlicensed data transmission is to be performed,
       determine a time gap duration until a start time of a subframe; and
       select a resource allocation transmission from a plurality of resource allocation transmissions as a function of the determined duration of the time gap duration, the resource allocation transmission allocating a radio resource for the LTE unlicensed data transmission of the communication device,
    wherein the communication device comprises a processing device configured to select as the resource allocation transmission a Wi-Fi Request to Send signal if the time gap duration exceeds a threshold, and one of a Wi-Fi Clear to Send signal or dummy data if the time gap duration is less than the threshold.

18. A communication system, comprising:
    a communication device comprising a transmitter configured to transmit LTE-unlicensed radio signals in an unlicensed frequency band, the communication device being configured to, in response to determining that an LTE-unlicensed data transmission is to be performed, determine a time gap duration until a start time of a subframe and to select a resource allocation transmission from a plurality of resource allocation transmissions as a function of the determined duration of the time gap duration, the resource allocation transmission allocating a radio resource for the LTE-unlicensed data transmission of the communication device; and a further communication device configured to receive the resource allocation transmission, the resource allocation transmission preventing the further communication device from transmitting in the allocated radio resource at the start time of the subframe, wherein the communication device comprises a processing device configured to select as the resource allocation transmission a Wi-Fi Request to Send signal if the time gap duration exceeds a threshold, and one of a Wi-Fi Clear to Send signal or dummy data if the time gap duration is, less than the threshold.

19. The communication system of claim 18, wherein the communication device is an eNodeB, and wherein the further communication device is one of a Wi-Fi transmitting device, user equipment of a cellular network, or a MAN access point.

* * * * *